Figure 1:
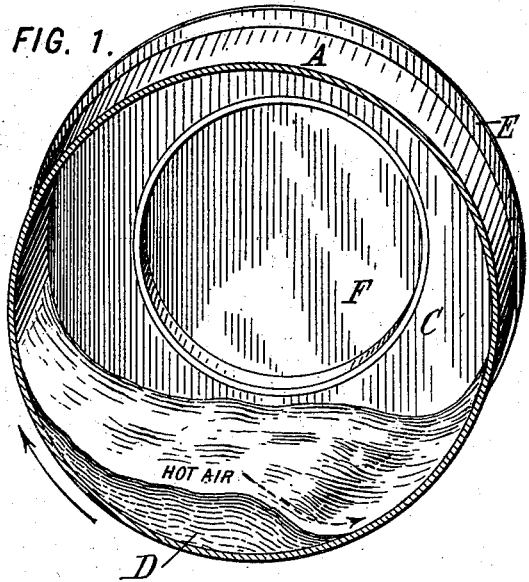

No. 668,162. Patented Feb. 19, 1901.
J. H. & C. H. CAMPBELL.
PROCESS OF DESICCATING MILK.
(Application filed Apr. 4, 1900.)

(No Model.) 2 Sheets—Sheet I.

WITNESSES:
Fred White
Thomas F. Wallace

INVENTORS:
Joseph H. Campbell and
Charles H. Campbell,
By Attorneys,
Arthur E. Draser & Co

THE NORRIS PETERS CO., PHOTO-LITHO., WASHINGTON, D. C.

No. 668,162. Patented Feb. 19, 1901.
J. H. & C. H. CAMPBELL.
PROCESS OF DESICCATING MILK.
(Application filed Apr. 4, 1900.)
(No Model.) 2 Sheets—Sheet 2.
FIG. 6.
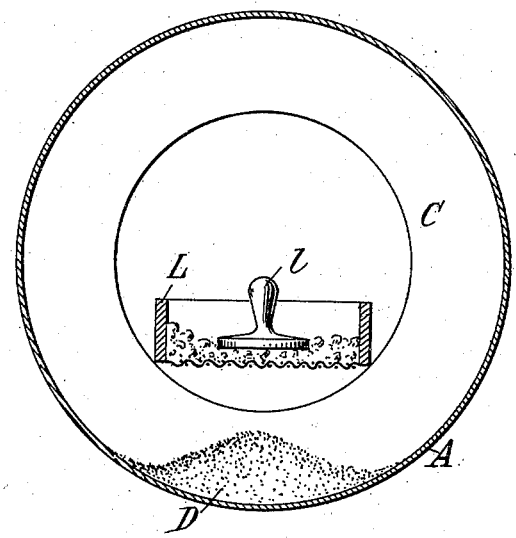
FIG. 7.
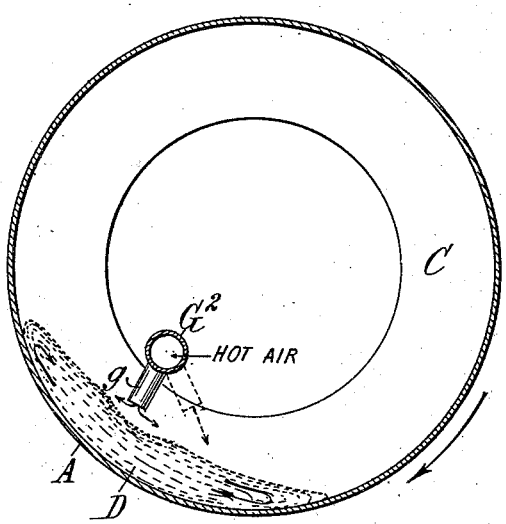
FIG. 8.
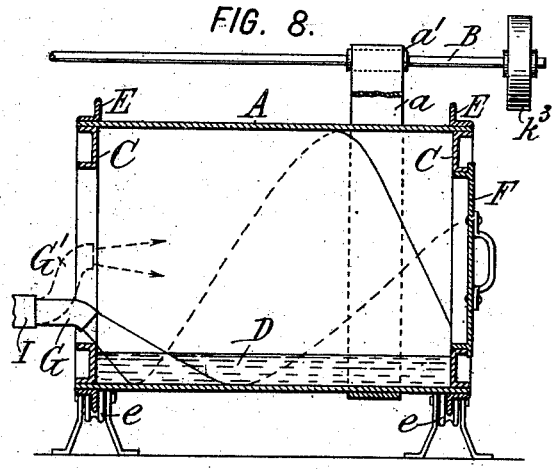
FIG. 9.
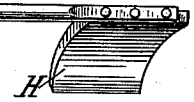
FIG. 11.
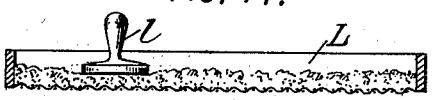
FIG. 13.
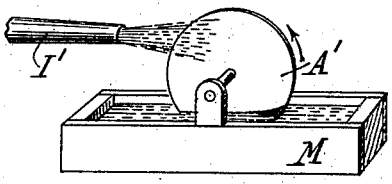
FIG. 10.
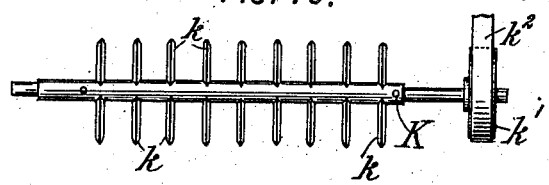
FIG. 12.
WITNESSES:
Fred White
Thomas F. Wallace
INVENTORS:
Joseph H. Campbell & Charles H. Campbell
By Attorneys,
Arthur E. O'Brien & Co.

UNITED STATES PATENT OFFICE.

JOSEPH H. CAMPBELL, OF NEW YORK, N. Y., AND CHARLES H. CAMPBELL, OF PHILADELPHIA, PENNSYLVANIA; SAID CHARLES H. CAMPBELL ASSIGNOR TO SAID JOSEPH H. CAMPBELL.

PROCESS OF DESICCATING MILK.

SPECIFICATION forming part of Letters Patent No. 668,162, dated February 19, 1901.

Application filed April 4, 1900. Serial No. 11,420. (No specimens.)

*To all whom it may concern:*

Be it known that we, JOSEPH H. CAMPBELL, residing in the city, county, and State of New York, and CHARLES H. CAMPBELL, residing in the city and county of Philadelphia, in the State of Pennsylvania, citizens of the United States, have invented certain new and useful Improvements in Processes of Desiccating Milk, of which the following is a specification.

This invention relates to the treatment of milk, such as ordinary cows' milk, for the production of a desiccated product consisting of the milk solids separated from a portion of the water of the milk.

Our invention provides a process in which all the solids of the milk may be retained and in which the casein and other proteids of the milk may be retained, with all their original peptogenic qualities, and be readily soluble in water, as in the application of Joseph H. Campbell for a process of desiccating milk filed March 16, 1900, Serial No. 8,979.

Our invention aims especially to provide an improved process over that set forth in the above-mentioned application by which the same results may be obtained in a shorter space of time and under other advantageous conditions, which will be hereinafter referred to.

The leading constituents of milk are water, milk-fat, and non-fatty solids. In making a completely-desiccated milk it is primarily necessary, in order to guard against fermentation, to remove the milk-fat. There are then remaining the non-fatty solids, consisting of milk-sugar, proteids, and mineral matters, the latter including potash, soda, lime, magnesia, phosphoric acid, and chlorin. Of the proteids casein is the principal one, amounting in weight to nearly four per cent. of normal milk.

In order to produce a completely-desiccated milk wherein are combined the non-fatty solids of milk, unchanged in proportion or character, and wherein the proteids are retained of undiminished solubility and susceptibility to peptogenic action, (or, in other words, a dried skimmed milk which is readily soluble in water and as digestible as fresh milk,) it is necessary to effect the concentration of the milk at a temperature in the neighborhood of 100° to 120° Fahrenheit and well below 140° Fahrenheit, (the point at which coagulation of albumen commences,) and because this temperature is most favorable to fermentation it is necessary also to perform the evaporation with great rapidity.

Our invention provides a process in which the desiccating action instead of being applied to a body of the milk of considerable dimensions is applied to a film or layer thereof until the desired degree of dryness is obtained, the action of the desiccating medium being very well distributed and thorough, because of the large surface exposed to the treatment, and being therefore very rapid, and a low temperature being maintained by reason of the rapid evaporation therefrom.

Our invention provides also various improvements in the subprocesses employed in executing the complete process of reduction from the raw state to the fully-desiccated state, all of which will be hereinafter set forth.

In order to enable others to practice our invention, we will now describe in detail a process embodying the same.

In the accompanying drawings, which illustrate such a process and an apparatus for carrying out the same, Figures 1 to 7, inclusive, illustrate the conditions which obtain at successive periods of the complete process from the condition of fresh-skimmed milk to the final condition, Fig. 1 being a sectional perspective, and Figs. 6 and 7 being sections of the drum or cylinder in which the operation is carried on. Fig. 8 is a longitudinal section through said drum or cylinder. Figs. 9, 10, 11, and 12 are views of the various tools or mechanisms used in carrying out the process. Fig. 13 is a perspective view illustrating a modified mechanism which may be used in carrying out the process.

We will first describe the apparatus which we have illustrated and then the method of carrying out the process by means of this particular apparatus.

Referring to the drawings, A indicates a horizontal cylindrical tank, which is rotated at a rather slow speed by the belt $a$, Fig. 8, running around the drum and over the pulley $a'$ on the driving-shaft B. C indicates flanges or heads on said drum, projecting inward a distance somewhat greater than the depth of milk to be treated, as shown at D in Fig. 8. E indicates circular ribs or rails on said drum, which rest in grooved pulleys $e$, and thereby support said drum rotatively. Within the flanges C are spaces affording access to the interior from either end, which spaces may be closed by covers or heads F.

G is the nozzle of a hot-air pipe I and may be turned to blow the air in any desired direction—as shown, for example, to the dotted line position $G'$ in Fig. 8. The spirals within the cylinder in Fig. 8 show the direction of the extreme elements of the column of air when the nozzle is in the position G, the portion on the near side of the plane of section being indicated by dotted lines. Instead of a single adjustable nozzle separate nozzles detachable from the main air-pipe may be used.

Figure 4:
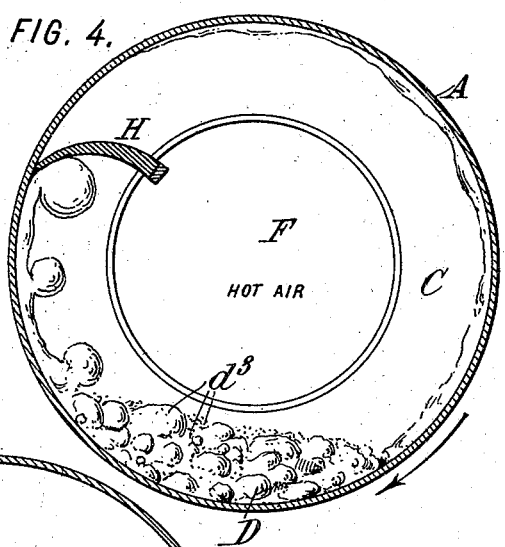
Figure 5:
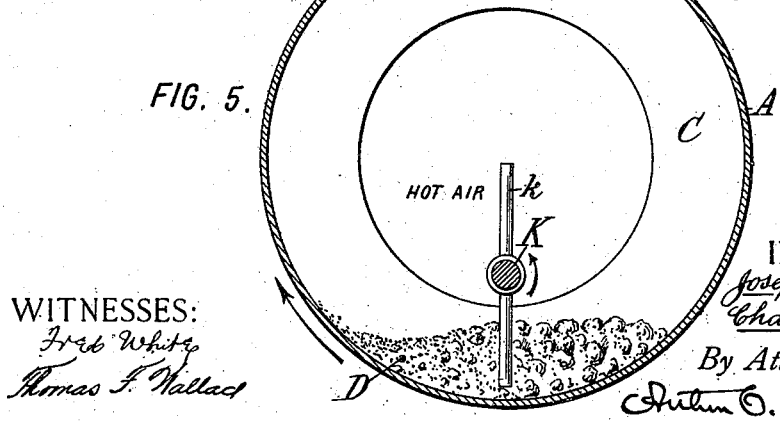

For scraping the viscous material from the sides of the cylinder, as hereinafter described, a knife H, Fig. 9, may be used, provided with a handle $h$, projecting through one of the end openings and either mounted in rigid bearings or held by hand and moved along the surface to any desired point, as shown in Fig. 4.

For reducing the mass to a granular condition, as also hereinafter described, we may use a breaker, Fig. 10, and a sieve, Fig. 11, the first for breaking the large lumps, and the second for reducing all the particles to the size necessary for complete desiccation. The breaker consists of a shaft K, having a series of arms or cutting-blades $k$ and adapted to be rotated by a pulley $k'$ and belt $k^2$, running from a second pulley $k^3$ on the driving-shaft B. Any suitable means for removably supporting the shaft K within the drum in the position shown in Fig. 5 may be used.

The sieve L may be of the ordinary box type, with a rubbing-tool $l$ for forcing the larger lumps through the meshes. Any suitable support—such as the edges of the end flanges C, Fig. 6—may be used, and the operation of pressing the lumps through the bottom may be carried on by hand or otherwise.

The hot-air nozzle which is preferably used in the final stage is a tube $G^2$, Fig. 12, of the full length of the cylinder and having lateral branches $g$, which may be shortened to become mere perforations or a continuous slit in the side of the tube $G^2$. It is supported in operation in the position of Fig. 7 within the cylinder, and by turning the branches $g$ the distance from the material to the mouth of the nozzle and the angle at which the blast strikes the material may be varied, so as to regulate the proportion of the surrounding air which mixes with the hot air before the latter reaches the material and the extent of surface which the blast strikes directly, and consequently to regulate the temperature of the atmosphere immediately adjacent to the exposed layer and the degree of heat transmitted to said layer.

Figure 2:
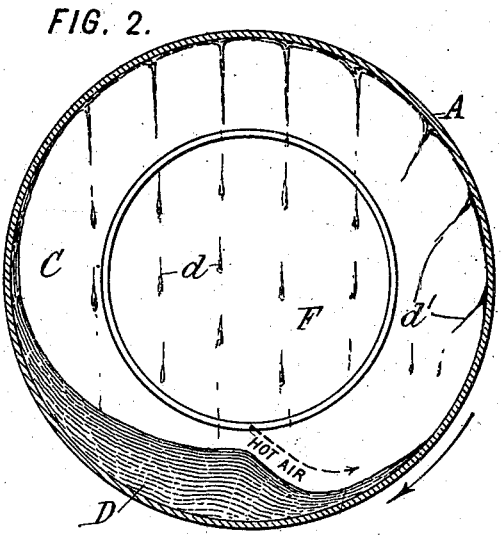
Figure 3:
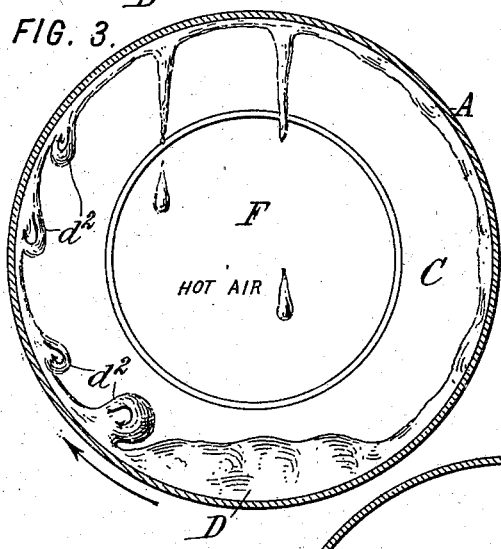

In the process illustrated the milk is drawn out into a film by its adhesion to a surface, preferably the surface of a rotating cylinder A, the direction of rotation being shown by the outside arrow in Figs. 1 and 2. As shown, this cylindrical surface is circular in cross-section; but it may have any cross-section most convenient, such as an irregular curve or a polygon. It is also preferable to have the film drawn out on the inner side of such cylinder and to carry the body of milk D under treatment within said cylinder, the ends thereof being partly closed by the inwardly-turned flanges C for this purpose. The rotation of the cylinder draws out a film of milk of a thickness varying with the degree of concentration and the adhesive quality or stickiness of the milk. Simultaneously with the drawing out of the film a blast of hot air is projected against it to promote evaporation and carry away the water, and preferably in a direction opposite to that of the movement of the film, as shown by the dotted arrow in Figs. 1 and 2 and by the nozzle G and spiral lines in Fig. 8, so as to impede such movement and hold the film exposed to the desiccating action for a longer time than would otherwise be the case, and for another purpose, which will appear hereinafter.

Fig. 1 shows the initial stage, the film of milk being so thin as to be incapable of illustration. The temperature of the air-blast may vary within a very great range. In our experiments we have varied it from 140° to 160° Fahrenheit in immediate proximity to the milk, the latter being at about 100° to 120° Fahrenheit, as above stated, and the temperature of the air emerging from the nozzle twelve or eighteen inches away being 160° to 200° Fahrenheit. Our process is so efficient, however, that we may employ a temperature in the milk below 90° Fahrenheit without consuming so much time as to permit lactic fermentation. The mixture of the blast with cooler atmospheric air, the evaporation of water in the milk, and the cooling of the latter by contact with the drum all assist in causing the great drop between the temperature of the air in the nozzle and the temperature of the milk. The conditions shown in Fig. 1 continue for several hours until the milk is about one-fourth to one-sixth its original volume, or even less if it was originally very thin, and begins to exhibit slight viscosity and stickiness when it gradually changes to the conditions shown in Fig. 2. It contains now about one-half water and one-half solids. At this period the stickiness and viscosity of the milk gradually increase, and the film which is first drawn out, after passing once around the cylinder under exposure to the desiccating atmosphere therein, sticks, at least in part, to the surface of the cylinder and carries on its own exposed surface a second film. This second film is in turn subjected to the desiccating action and then coated with a third film, thus obtaining a coating of gradually-increasing thickness and composed of films which have been individually and separately subjected to the desiccating action. The film which is directly exposed to the desiccating atmosphere undergoes an evaporation the cooling effect of which maintains it at a temperature considerably lower than that of such atmosphere, and the conditions are so regulated that the temperature of such film shall be as high as possible consistent with perfect safety against injury to the proteids. The inner film, (that farthest from the desiccating atmosphere,) however, is inclosed against evaporation by the outer films, and in order to reduce the tendency of said inner film to burn and to maintain it cold and moist, so that it will stick firmly to the cylinder and carry the coating around thereon as long as possible, we preferably make the cylinder A, on the surface of which the film is drawn out, of heat-conducting material, such as tinned sheet metal, and maintain a temperature on the side of said cylinder opposite said film as low as or lower than the temperature desired in the milk. The average temperature of work-rooms—from 70° to 80° Fahrenheit—will ordinarily suffice; but if necessary we may create a cooler temperature adjacent to said surface by artificial means. This arrangement operates to withdraw heat from the inclosed inner film as fast as it is transmitted thereto from the inclosing or outer films and prevents an excessive heat in said inner film. While the milk is in its original very fluid condition the film remains so thin and runs from the surface so rapidly that there is no danger of imprisoning and burning any portion thereof, and the evaporation and consequent cooling is so great that the necessity of a low temperature on the side of the cylinder opposite the film disappears. In fact the process may be hastened by heating such side somewhat above the temperature of the milk without overheating the latter, and this condition of affairs may be maintained until the milk is condensed to approximately from one-fourth to one-sixth its original volume, when its viscous qualities begin to appear, after which the outside temperature should be reduced, as described. As the cylinder is rotated slowly with the thinly-viscous coating on its inner surface said coating is carried up one side and drops like rain from the top, as shown at $d$, into the mass below. It is also blown out by the upwardly-moving blast from the downwardly-moving side of the cylinder, as at $d'$, adding to the rain from the top. All these drops passing through the desiccating atmosphere expose additional surface thereto, with the same result as an additional film would have, and so hasten the process. The conditions indicated in Fig. 2 continue for about one-half to one hour and mark the transition from the very fluid condition of Fig. 1 to the viscous condition of Fig. 3. As the mass becomes more thickly viscous, with an intensification of its sticky quality, (see Fig. 3,) the direction of the blast has very little effect, and the desiccating atmosphere may be maintained by projecting the air centrally or otherwise into the cylinder, as by the nozzle G' in Fig. 8. The drops from the top become larger and fewer, and down the ascending side roll large irregular balls $d^2$ of intense stickiness. So sticky is the mass that it is only when a coating of considerable thickness and weight has accumulated that it separates and rolls down, taking up additional material as it rolls, like a snowball, and thus exposing the different portions of the mass again and again to the desiccating action, as indicated by the arrows. These conditions continue for about one and one-half hours, the stiffness of the mass increasing gradually. At the end of this period the mass changes quite rapidly, probably because of the comparatively small amount of moisture remaining, to the solid or slightly plastic condition of Fig. 5. Just before this change is completed (see Fig. 4) the coating is scraped from the surface, as by a scraper H, and rolls down into the mass in the form of lumps and particles $d^3$ of all sizes between a fine powder and large loaves of bread. These lumps, though slightly plastic, are devoid of stickiness on their exposed portions, and therefore are no longer drawn up on the moving surface. They have, however, sufficient cohesion to retain their form and are crumbly on the outside and moist on the inside. This transition stage between the conditions of Fig. 3 and those of Fig. 5 lasts only long enough to carry out the mechanical operation of removing the mass from the surface of the cylinder—say about ten minutes. The next step (shown in Figs. 5 and 6) is the reduction of the large lumps to a size which permits the application of the desiccating action to their interiors, which otherwise would ferment before drying. This step is assisted by the fact that, maintaining the desiccating atmosphere and breaking the lumps, the interior portions so exposed very quickly become crumbly and do not readily join together again. We further assist the process by breaking the large lumps in the mixture with the fine particles, the latter entering the fissures in the large lumps and preventing the rejoining of the separated parts thereof. In order to prevent heating of the mass by compression and friction in thus subdividing it, we prefer to perform the subdivision in a free space, as shown, in which the comparatively dry particles moving freely over each other like dry sand or stones may yield to any lateral pressure and so prevent compression of the mass as a whole. For breaking the larger lumps we use a rapidly-rotating shaft K, carrying arms or knives $k$ and supported in the position shown in Fig. 5, the mounting of and means of rotating said shaft being immaterial, and the principal use of this action being to reduce the particles to a size convenient for forcing through a sieve. To further reduce all the particles to a size most convenient for rapid drying, we force them, while still slightly plastic, through a sieve of preferably one-sixteenth to one-eighth inch mesh, as shown in Fig. 6, the rotation of the cylinder and the air-blast being stopped, if necessary, during this operation. The action of the breaker and sieve together is completed in about fifteen or twenty minutes and brings the mass to the condition shown at D in Fig. 6. The mass is now reduced to a comparatively uniform granular condition of any desired degree of fineness and may be uniformly and completely desiccated in any preferred manner. According to the process illustrated we have retained the granular mass in the same cylinder in which it was formed, recommencing the slow rotation of said cylinder and introducing a desiccating atmosphere thereinto, preferably through a long tube $G^2$ having a series of lateral branches $g$, Fig. 12. The rotation of the cylinder turns the bottom of said mass upward continuously, as shown by the arrows in Fig. 7, thus exposing the entire mass in a series of successive layers to the dessiccating atmosphere in a manner similar to the exposure of successive films of the fluid milk. As the drying proceeds the evaporation is less and the temperature of the milk tends to rise. This we prevent by reducing the temperature of the atmosphere immediately adjacent to the exposed layer, the rate of reduction being such as to maintain the milk at a constant temperature. This reduction is most conveniently accomplished by gradually increasing the obliquity of the angle at which the blast strikes the exposed surface, and also the distance from the milk to the exit points of the hot-air tube $G^2$, by turning said tube slightly on its axis, as shown in dotted lines, whereby the same quantity of hot air is distributed over a greater area of milk, so as to reduce the intensity of the applied temperature, and an increasing amount of the surrounding air is mixed with the hot air before the latter comes into contact with the milk. The turning up of successive layers and the application of a desiccating atmosphere after one or two hours brings the mass to a practically bone-dry condition, (containing about 8 per cent. of water,) in which condition it may be ground to any desired degree of fineness or may be marketed directly.

Though we have described with great particularity of detail a process embodying our invention, it will be understood that many modifications of the complete process and of the subprocesses described are possible without departing from the spirit of our invention, and though we have described but one apparatus for carrying out the process it is understood that the same process may be carried out by a great variety of evaporating, desiccating, and breaking machines. For example, in the apparatus shown in Fig. 13 a disk $A'$ revolves in a tank M of milk, drawing out on its surface a film thereof, and a tube $I'$ projects a blast of hot air thereon in a direction opposite that of the revolution of the disk. By means of this apparatus the steps shown in Figs. 1 to 4 may be conveniently carried out, the reduction to a granular state and subsequent further desiccation being carried out in any desired manner, or any one of the several steps in our process may be varied without sacrificing the advantages of the remainder of the process—for example, the reduction from the original very fluid condition to a slightly-viscous condition may be carried out according to any ordinary process of condensing milk—though, if any other than that described herein is to be used, we prefer that described in the application of Joseph H. Campbell for a patent on a process for the treatment of milk, filed June 30, 1900, Serial No. 22,105, as preserving the original solubility and peptogenic qualities of the proteids. In fact the process may be advantageously carried out by reducing the milk by means of the treatment described in said application to the consistency of ordinary condensed milk and continuing the treatment from that point according to the process herein set forth. It will be understood also that we do not limit ourselves by the word "desiccation" to the entire process herein set forth by which the milk is reduced from the fluid to the practically completely desiccated state, since the partial desiccating of the same, commencing with the milk in any desired state of fluidity and finishing with it of any desired degree of dryness, is equally within our invention. It will be understood also that by a "film" we do not mean to limit ourselves to a mass which is of any particular extent. It is obvious that a series of narrow streams of any width may be substituted for one wide stream or film and that in fact a series of drops by reason of their great surface exposure in proportion to their volume are the equivalent for the purposes of this invention of the film shown.

What we claim, therefore, and desire to secure by Letters Patent, is a process of desiccating milk embracing the following-defined novel steps, all substantially as described in the foregoing specification:

1. In the desiccation of milk, the process which consists in drawing it out while in a fluid state into a film and subjecting said film to the action of a desiccating atmosphere until it becomes a viscous paste, then conveying a coating of said paste on an upwardly-moving surface, maintaining a desiccating atmosphere adjacent to said coating, and gradually increasing the thickness of said coating until the weight thereof causes it to separate from and roll down said surface, whereby the different portions of said coating are exposed again and again to said desiccating atmosphere and said viscous mass is solidified, reducing the larger lumps of said solidified material by breaking them in a free space whereby their moist interiors are exposed without compression and the mass is reduced to a granular condition, and finally subjecting said granular mass to desiccation until said grains are dry and hard, the milk being maintained at a temperature below the coagulating-point of albumen and air being supplied in such volume that the milk is desiccated so rapidly as to prevent souring.

2. In the desiccation of milk, the process which consists in drawing it out into a film, maintaining it at a temperature below the coagulating-point of albumen, and subjecting said film to the desiccating action of air in such volume that the milk is desiccated so rapidly as to prevent souring.

3. In the desiccation of milk, the process which consists in drawing it out into a continuous film from the body of milk under treatment, maintaining it at a temperature below the coagulating-point of albumen, and subjecting said film to the desiccating action of air and returning said film to said body of milk, the air being supplied in such volume that the milk is desiccated so rapidly as to prevent souring.

4. In the desiccation of milk, the process which consists in drawing it out into a film from one part of the body of milk under treatment, maintaining it at a temperature below the coagulating-point of albumen, subjecting said film to the desiccating action of air, and returning said film to an opposite part of said body, whereby all portions of said body are treated in succession, the air being supplied in such volume that the milk is desiccated so rapidly as to prevent souring.

5. In the desiccation of milk, the process which consists in drawing it out into a film, and maintaining a relatively high temperature at one side of said film and a relatively low temperature at the other side thereof, whereby rapid evaporation from said film at a desired mean temperature below the coagulating-point of albumen is effected, air being supplied in such volume that the milk is desiccated so rapidly as to prevent souring.

6. In the desiccation of milk, the process which consists in drawing it out into films successively upon one another, subjecting the outer film continuously to a relatively high temperature and the inner film to a relatively low temperature, whereby rapid evaporation from said films at a desired mean temperature below the coagulating-point of albumen is effected, air being supplied in such volume that the milk is desiccated so rapidly as to prevent souring.

7. In the desiccation of milk, the process which consists in drawing it out into a film on a surface of conducting material, maintaining a relatively high temperature on the film-coated side of said conducting material, and a relatively low temperature on the opposite side thereof, whereby rapid evaporation from said film at a desired mean temperature below the coagulating-point of albumen is effected, air being supplied in such volume that the milk is desiccated so rapidly as to prevent souring.

8. In the desiccation of milk, the process which consists in drawing it out into a film on a surface of conducting material, heating said conducting material and projecting a blast of air against said film until said film is condensed to the consistency of a thin batter, then maintaining a relatively high temperature on the film-coated side of said conducting material and a relatively low temperature on the opposite side thereof, whereby rapid evaporation from said film at a desired mean temperature below the coagulating-point of albumen is effected, air being supplied in such volume that the milk is desiccated so rapidly as to prevent souring.

9. In the desiccation of milk, the process which consists in drawing it out into a continuous moving film, maintaining it at a temperature below the coagulating-point of albumen, and projecting air on said film in a direction opposite the direction of movement thereof, whereby the movement of said film is retarded, and in such volume that it is desiccated so rapidly as to prevent souring.

10. In the desiccation of milk, the process which consists in drawing it out into a continuous moving film on a surface of conducting material, maintaining a relatively low temperature on the side of said conducting material opposite said film, and projecting air on said film in a direction opposite to the direction of movement thereof, whereby the movement of said film is retarded, the projected air being in such volume that the milk is desiccated so rapidly as to prevent souring, and at such a relatively high temperature that the milk is desiccated at a desired mean temperature below the coagulating-point of albumen.

11. In the desiccation of milk, the process which consists in drawing it out into a film on the inner surface of a rotating cylinder, maintaining it at a temperature below the coagulating-point of albumen, and supplying air within said surface in such volume that the milk is desiccated so rapidly as to prevent souring.

12. In the desiccation of milk, the process which consists in drawing it out into a film on the inner surface of a rotating cylinder, and projecting hot air within said surface in a direction opposite to the direction of revolution of said surface, the milk being maintained at a temperature below the coagulating-point of albumen and air being supplied in such volume that it is desiccated so rapidly as to prevent souring.

13. In the desiccation of milk, the process which consists in drawing it out into a film on the inner surface of a cylinder revolving on a horizontal axis, retaining the supply of milk within said surface from which said film is continuously fed until desiccated to the desired degree, and maintaining a desiccating atmosphere within said surface, the milk being maintained at a temperature below the coagulating-point of albumen and air being supplied in such volume that it is desiccated so rapidly as to prevent souring.

14. In the desiccation of milk, the process of reducing the same from a viscous to a solid condition which consists in feeding the same continuously to an upwardly-moving surface, conveying a coating thereof on said surface, maintaining a desiccating atmosphere adjacent to said coating, and continuing the operation so as to continuously increase the thickness of said coating until the weight thereof causes it to separate from and roll down said surface, whereby the different portions of said coating are exposed again and again to said desiccating atmosphere, the milk being maintained at a temperature below the coagulating-point of albumen and air being supplied in such volume that it is desiccated so rapidly as to prevent souring.

15. In the desiccation of milk, the process of reducing the same from a viscous to a solid condition which consists in conveying a coating thereof on the inner surface of a continuously-rotating cylinder, maintaining a desiccating atmosphere within said surface, and maintaining a supply of said milk within said surface from which said coating is continuously fed said process being continued to such a point that the weight of said coating increases and causes it to separate from and roll down said surface, whereby the different portions of said mass are exposed again and again to said desiccating atmosphere, the milk being maintained at a temperature below the coagulating-point of albumen and air being supplied in such volume that it is desiccated so rapidly as to prevent souring.

16. In the desiccation of milk, the process of reducing the same from a viscous to a desiccated granular condition which consists in conveying a coating thereof on an upwardly-moving surface, maintaining a desiccating atmosphere adjacent to said coating, and continuing the operation so as to gradually increase the thickness of said coating until the weight thereof causes it to separate from and roll down said surface, whereby the different portions of said coating are exposed again and again to said desiccating atmosphere and said viscous mass is solidified, reducing said solidified mass to a granular condition and finally subjecting such granular mass to desiccation until its grains are dry and hard, the milk being maintained at a temperature below the coagulating-point of albumen and air being supplied in such volume that it is desiccated so rapidly as to prevent souring.

17. In the desiccation of milk, the process of reducing solid lumps which consists in breaking said lumps in a free space whereby their moist interiors are exposed without compression of said lumps, the milk being maintained at a temperature below the coagulating-point of albumen and air being supplied in such volume that it is desiccated so rapidly as to prevent souring.

18. In the desiccation of milk, the process which consists in reducing the same to a mixture of solid particles of varying sizes and reducing the larger particles by breaking them in a free space and in the mixture with the smaller particles, the milk being maintained at a temperature below the coagulating-point of albumen and air being supplied in such volume that it is desiccated so rapidly as to prevent souring.

19. In the desiccation of milk, the process which consists in reducing the same to a substantially granular condition, supporting the same on the inner surface of a rotating cylinder, and maintaining a desiccating atmosphere within said surface, whereby the different portions of said milk are successively exposed to the action of said desiccating atmosphere, the milk being maintained at a temperature below the coagulating-point of albumen and air being supplied in such volume that it is desiccated so rapidly as to prevent souring.

20. In the desiccation of milk, the process which consists in reducing the same to a substantially granular mass, maintaining a desiccating atmosphere in contact with said mass, and turning said mass continuously so as to expose successive layers thereof to the action of said desiccating atmosphere, said mass being maintained at a temperature below the coagulating-point of albumen and air being supplied in such volume that the milk is desiccated so rapidly as to prevent souring.

21. In the desiccation of milk, the process which consists in reducing the same to a substantially granular mass, maintaining in contact with said mass a blast of air at a higher temperature than that of the mass, and reducing the temperature of said atmosphere as the desiccation proceeds and the evaporation becomes slower, whereby the temperature of the mass is maintained approximately constant, said temperature being maintained below the coagulating-point of albumen and air being supplied in such volume that the milk is desiccated so rapidly as to prevent souring.

22. In the desiccation of milk by the action of a hot-air blast, the process of varying the applied temperature which consists in projecting the blast onto the milk through an intervening body of air and gradually increasing the distance through which said blast traverses said body of air.

23. In the desiccation of milk by the action of a hot-air blast, the process of varying the applied temperature which consists in projecting the blast onto the milk through an intervening body of air and gradually increasing the obliquity of the angle at which said blast strikes the exposed surface of said milk.

24. In the desiccation of milk by the action of a hot-air blast, the process of varying the applied temperature which consists in projecting the blast onto the milk through an intervening body of air and gradually increasing the distance through which said blast traverses said body of air and the obliquity of the angle at which said blast strikes the exposed surface of said milk.

In witness whereof we have hereunto signed our names in the presence of two subscribing witnesses.

JOSEPH H. CAMPBELL.
CHARLES H. CAMPBELL.

Witnesses:
DOMINGO A. USINA,
FRED WHITE.